United States Patent Office 3,663,541
Patented May 16, 1972

3,663,541
REACTIVE ANTHRAQUINONE DYESTUFFS CONTAINING A TOLYLSULFONYLMETHYLENE OXYTRIAZINE GROUP
Angelo Mangini, Antonio Tundo, and Bianca Flavia Bonini, Bologna, and Marta Rossetti, Milan, Italy, assignors to Aziende Colori Nazionali Affini ACNA S.p.A., Milan, Italy
No Drawing. Original application Mar. 21, 1966, Ser. No. 536,144, now Patent No. 3,527,747, dated Sept. 8, 1970. Divided and this application Mar. 31, 1970, Ser. No. 24,343
Int. Cl. C07d 55/46
U.S. Cl. 260—249                    2 Claims

ABSTRACT OF THE DISCLOSURE

Reactive triazine dyestuffs having the formula:

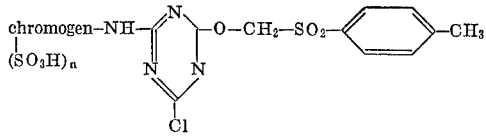

wherein chromogen is an anthraquinone dyestuff residue and $n$ is an integer from 1 to 4, are particularly effective for dyeing cellulose. The dyestuffs may be absorbed and fixed onto the cellulose fibers by hot or cold dyeing techniques. The dyestuffs have high reactivity and good dyeing power and the dyeings obtained therefrom have high brilliance and purity of chromatic shades and improved fastness to washing.

CROSS REFERENCES TO RELATED APPLICATIONS

This application is a division of copending application Ser. No. 536,144, filed Mar. 21, 1966, now U.S. Pat. No. 3,527,747, entitled "Reactive Azo Dyestuffs Containing a Tolylsulfonylmethylene Oxytriazine Group."

BACKGROUND OF THE INVENTION (1) Field of the invention

The present invention relates to a new class of reactive dyestuffs. More particularly, the present invention relates to dyestuffs which are capable of forming chemical bonds with the hydroxyl groups of cellulose during the dyeing process, thereby giving dyeings which are particularly stable to wet treatments.

(2) Description of the prior art

Various classes of dyestuffs having reactive groups capable of forming such bonds are already known. These include dyestuffs containing at least one of the following reactive groups: monochlorotriazinyl, dichlorotriazinyl, trichloropyrimidyl, vinylsulfonic, and dichloroquinoxalyl. The dyeing conditions for applying these dyestuffs vary according to the nature of the reactive groups present.

SUMMARY OF THE INVENTION

The present invention provides a new class of dyestuffs characterized by the presence, as a reactive group, of the radical

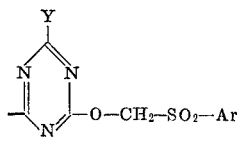
(I)

wherein Ar is a substituted or unsubstituted aromatic radical such as an alkyl substituted, preferably lower alkyl substituted, aromatic radical and most preferably

and Y is chlorine or bromine. The present invention also provides methods for preparing such dyestuffs.

DESCRIPTION OF THE PREFERRED EMBODIMENTS

These dyestuffs may be represented by the following general formula:

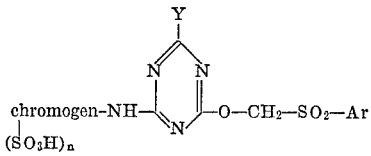

wherein $n$ is an integer from 1 to 4, Y and Ar are as defined above, and chromogen is the residue of an anthraquinone dyestuff.

The reactive radical (I) contains a mobile halogen which, when bound to a dyestuff residue, can, under suitable conditions, react with the hydroxyl groups of cellulose, with the $NH_2$ groups of protein fibers or with the NH groups of synthetic polyamides to form covalent bonds between the dyestuff and the fiber.

The halogen, which remains bonded to the triazine nucleus of radical (I), has a markedly higher reactivity as compared to the halogen present in corresponding triazine derivatives which have bonded to the triazine nucleus, instead of the group $-O-CH_2-SO_2-Ar$, other substituents, for example, an amino group, a mono- or di-alkyl substituted amino group, an aralkyl group, a heterocyclic group, an alkoxy group, an aryloxy group, a thioalkyl group or a thioaryl group.

On the other hand, the reactivity of the triazine nucleus is slightly reduced because of the presence of the group $-O-CH_2-SO_2-Ar$, thus resulting in greater stability during drying and storage.

The higher reactivity of the dyestuffs of the present invention, which contain the radical (I) as a reactive group, as compared to the dyestuffs containing, as reactive groups, the radical (II)

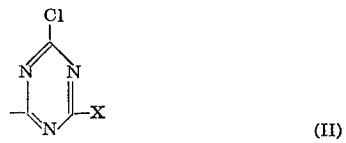
(II)

wherein X is $NH_2$, NH—R, OH, OR, SH or SR, R being a substituted or unsubstituted alkyl or aryl group, can be shown by the fact that the reactive dyestuffs containing the radical (I) are capable of dyeing cellulose fibers from an alkaline bath at 40° C., whereas the reactive dyestuffs containing the radical (II) require higher bath temperatures, such as for instance 75°–85° C. This remarkably improved reactivity also allows the use of lower concentrations of alkalies, as well as the use of continuous dyeing methods, thus reducing the cost of dyeing.

Besides the high reactivity, the dyestuffs of the present invention have numerous additional advantages, such as very good dyeing power, high brilliance and purity of the chromatic shade, and improved fastness to wet treatments of dyed or printed cellulose materials and natural or synthetic polyamide materials.

The dyestuffs of the present invention may be prepared by reacting cyanuric chloride (III) with an aryl-sulfonyl carbinol (IV) and thereafter condensing the thus obtained triazine (V) with an anthraquinone containing a free amino group to yield the reactive dyestuff (VI).

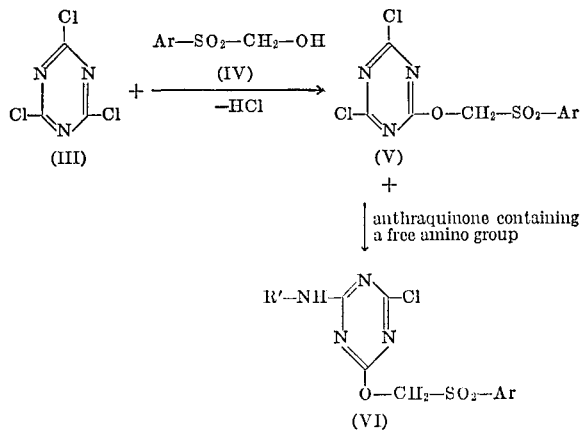

wherein R' is the residue of the anthraquinone dyestuff used.

In order to improve the storage stability of the dyestuffs of the present invention to buffering substances such as borates, phosphates, or monosodium phosphate, disodium phosphate or mixtures thereof may be added thereto.

The present invention also provides cellulose and natural or synthetic materials dyed or printed with one or more of the dyestuffs containing, as a reactive group, the radical (I).

The following examples serve to further illustrate the present invention without in any way limiting the scope thereof.

EXAMPLE 1

Preparation of the triazine (VII)

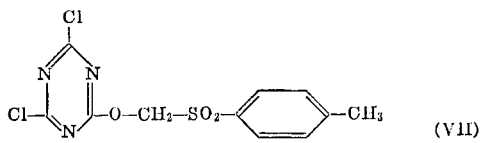

A solution of 0.1 mol of p-tolyl-hydroxymethyl-sulfone in 100 ml. of acetone was introduced dropwise within 20–30 minutes, while maintaining the temperature at about 0° C., into a solution of 0.1 mol of cyanuric chloride in 200 ml. of acetone. Then, within about 40 minutes, a solution of 0.1 mol of collidine in 50 ml. of acetone was introduced, while the temperature was maintained at about 0° C. The collidine hydrochloride immediately began to precipitate. The mixture was kept under agitation at 0° for 5 hours and then the collidine hydrochloride was filtered off. The acetone solution filtrate was poured into water and ice under agitation. The precipitated product was collected by filtration and dried under vacuum. After crystallization from carbon tetrachloride, it had a melting point of 168–70° C.

EXAMPLE 2

0.01 mol of the triazine (VII) (prepared as described in Example 1) was dissolved in 120 ml. of acetone and the solution was added dropwise at 20° C. under agitation to an aqueous solution containing 0.01 mol of 1-amino-2-sulfo-4-(4'-amino-3'-sulfoanilino)-anthraquinone and 0.01 mol of sodium acetate. After completion of the addition, the agitation was continued until complete solution occurred. Then the solution was neutralized and the dyestuff salted out. The dyestuff, which was collected by filtration, had the following structure:

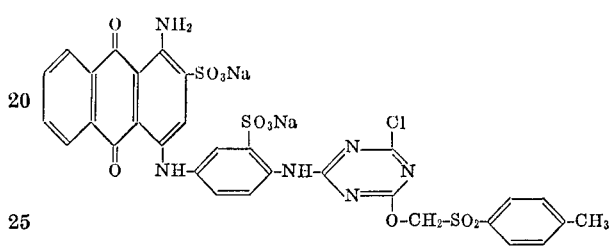

It gave a very fast blue dyeing when applied to cellulose fibers.

Variations and modifications can, of course, be made without departing from the spirit and scope of the invention.

Having thus described the invention, what is desired to be secured by Letters Patent and is hereby claimed is:

1. A reactive dyestuff of the formula:

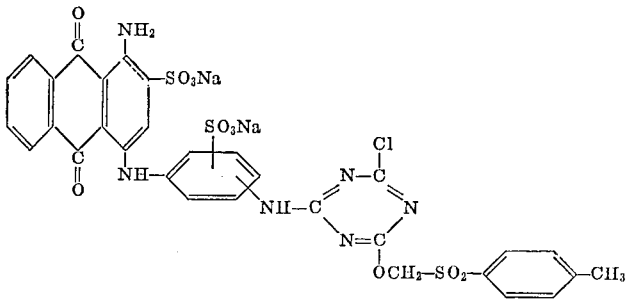

2. A reactive dyestuff of having the structure:

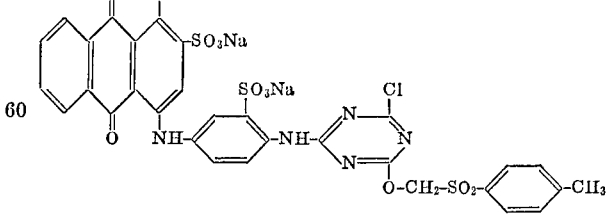

References Cited

UNITED STATES PATENTS

| | | | |
|---|---|---|---|
| 3,073,824 | 1/1963 | Gunst et al. | 260—249 |
| 3,095,415 | 6/1963 | Staeuble et al. | 260—249 |
| 3,499,896 | 3/1970 | Neeff | 260—249 |

JOHN M. FORD, Primary Examiner

U.S. Cl. X.R.

8—39; 260—248 CS

UNITED STATES PATENT OFFICE
CERTIFICATE OF CORRECTION

Patent No. 3,663,541        Dated May 16, 1972

Inventor(s) ANGELO MANGINI, ANTONIO TUNDO, BIANCA FLAVIA BONINI and MARTA ROSETTI It is certified that error appears in the above-identified patent and that said Letters Patent are hereby corrected as shown below:

Column 1, in the first structural formula, lines 20-25, that portion of the formula reading:

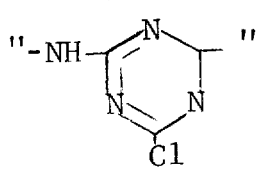 should read 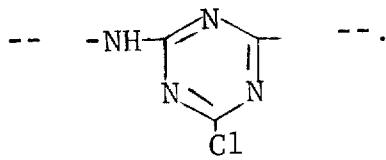

Column 4, line 54: "dyestuff of having" should read -- dyestuff having --.

Signed and sealed this 14th day of November 1972.

(SEAL)
Attest:

EDWARD M. FLETCHER, JR.        ROBERT GOTTSCHALK
Attesting Officer        Commissioner of Patents